United States Patent
Horowitz et al.

(10) Patent No.: US 7,627,043 B2
(45) Date of Patent: Dec. 1, 2009

(54) METHOD AND APPARATUS FOR TRANSMITTING DATA WITH REDUCED COUPLING NOISE

(75) Inventors: Mark A. Horowitz, Menlo Park, CA (US); Donald V. Perino, Los Altos, CA (US)

(73) Assignee: Rambus Inc., Los Altos, CA (US)

( * ) Notice: Subject to any disclaimer, the term of this patent is extended or adjusted under 35 U.S.C. 154(b) by 750 days.

(21) Appl. No.: 11/130,502

(22) Filed: May 17, 2005

(65) Prior Publication Data

US 2005/0208838 A1 Sep. 22, 2005

Related U.S. Application Data

(63) Continuation of application No. 09/594,221, filed on Jun. 14, 2000, now abandoned.

(51) Int. Cl.
*H04B 3/00* (2006.01)
*H04L 25/00* (2006.01)

(52) U.S. Cl. .................. 375/257; 375/285; 375/346; 326/41; 326/101

(58) Field of Classification Search .......... 375/257, 375/285, 346; 327/565; 326/38, 41, 101; 439/941; 370/201
See application file for complete search history.

(56) References Cited

U.S. PATENT DOCUMENTS

| | | | | |
|---|---|---|---|---|
| 3,761,842 A * | 9/1973 | Gandrud | .................. | 333/1 |
| 3,764,727 A * | 10/1973 | Balde | .................. | 174/34 |
| 4,079,415 A | 3/1978 | Will | .................. | 358/86 |
| 4,977,542 A | 12/1990 | Matsuda et al. | .................. | 365/207 |
| 5,001,669 A | 3/1991 | Cho et al. | .................. | 365/210 |
| 5,088,064 A | 2/1992 | Tsukude | .................. | 365/207 |
| 5,140,556 A | 8/1992 | Cho et al. | .................. | 365/207 |
| 5,282,754 A | 2/1994 | Kish et al. | .................. | 439/108 |
| 5,414,393 A | 5/1995 | Rose et al. | .................. | 333/1 |
| 5,430,247 A * | 7/1995 | Bockelman | .................. | 174/33 |
| 5,454,738 A | 10/1995 | Lim et al. | .................. | 439/676 |
| 5,547,405 A | 8/1996 | Pinney et al. | .................. | 439/894 |
| 5,639,266 A | 6/1997 | Patel et al. | .................. | 439/676 |

(Continued)

FOREIGN PATENT DOCUMENTS

EP 0 558 225 9/1993

(Continued)

OTHER PUBLICATIONS

TB-2034 VHDM Signal Integrity Characterization Report, Revision "D", Teradyne, Inc. pp. 1-18, Aug. 2, 1999.

(Continued)

*Primary Examiner*—Phuong Phu
(74) *Attorney, Agent, or Firm*—Morgan, Lewis & Bockius LLP (57) ABSTRACT

A first integrated circuit is coupled to a first connector. A second connector is coupled to the first connector through multiple conductors, in which alternating pairs of conductors are reversed. A second integrated circuit is coupled to the second connector through a second group of conductors. The first integrated circuit includes multiple differential drivers and the second integrated circuit includes multiple differential receivers. The inductive coupling coefficient of the first device is modified to be substantially the same as the inductive coupling coefficient of the second device.

32 Claims, 6 Drawing Sheets

U.S. PATENT DOCUMENTS

| | | | |
|---|---|---|---|
| 5,673,009 A | 9/1997 | Klas et al. | 333/1 |
| 5,679,027 A | 10/1997 | Smith | 439/676 |
| 5,716,237 A | 2/1998 | Conorich et al. | 439/660 |
| 5,771,262 A | 6/1998 | Benayoun et al. | 375/257 |
| 5,853,303 A | 12/1998 | Bunker et al. | 439/637 |
| 5,915,989 A | 6/1999 | Adriaenssens et al. | 439/404 |
| 6,007,368 A | 12/1999 | Lorenz et al. | 439/418 |
| 6,015,299 A | 1/2000 | Walse et al. | 439/60 |
| 6,057,512 A * | 5/2000 | Noda et al. | 174/250 |
| 6,057,743 A | 5/2000 | Aekins | 333/1 |
| 6,515,508 B1 * | 2/2003 | Chang et al. | 326/38 |

FOREIGN PATENT DOCUMENTS

| | | |
|---|---|---|
| JP | 55-139569 | 10/1980 |
| JP | 09097232 A | 4/1997 |
| JP | 11-185886 | 7/1999 |
| WO | WO 94/05092 | 3/1994 |
| WO | WO 01/97391 | 12/2001 |

OTHER PUBLICATIONS

Teradyne VHDM HSD (High-Speed Differential) Interconnect Web Pages (3 pgs.) and Drawings, Teradyne, Inc. 1999.

DS36954, Quad Differential Bus Transceiver, 1990 National Semiconductor Corporation DS011014, Jul. 1998, pp. 1-10.

National Semiconductor, "DS 36954 Quad Differential Bus Transceiver," 1999 National Semiconductor Corporation DS011014, 11 pages.

Temmyo, J., "Characteristic Impedance Design Considerations for a High-Speed Superconducting Packaging System," IEEE Transactions on Microwave Theory and Techniques, vol. MTT-33, No. 5, May 1985, pp. 414-417.

Zhang, Q., "Signal Integrity Optimization of High Speed LSI Packages and Interconnects," IEEE 1998 Electronic Components and Technology Conference, pp. 1073-1076.

* cited by examiner

METHOD AND APPARATUS FOR TRANSMITTING DATA WITH REDUCED COUPLING NOISE

CROSS-REFERENCE TO RELATED APPLICATION

The present application is a continuation of prior U.S. patent application Ser. No. 09/594,221, filed Jun. 14, 2000 now abandoned, which application is incorporated herein by reference in its entirety.

TECHNICAL FIELD

The present invention relates to the transmission of data. More specifically, the present invention reduces coupling noise between conductors by using particular routing patterns for the conductors and/or modifying the coupling such that the transmitter coupling is approximately the same as the receiver coupling.

BACKGROUND

Transmission lines often suffer from crosstalk which results from the parasitic coupling between nearby conductors. The coupling between the conductors can be either capacitive or inductive in nature and is typically associated with integrated circuit packages, connectors, and printed circuit traces positioned in parallel with one another.

A particular type of data transmission system transmits signals differentially along pairs of conductors. A differential driver receives data at an input and generates a corresponding differential signal on a pair of outputs (i.e., an inverting output and a non-inverting output). The differential signal is transmitted across a pair of conductors and received by a differential receiver, which rejects signals that are present on both conductors (referred to as common mode signals). This differential transmission system helps reduce noise that is induced on both conductors, however coupling noise still exists on the conductors. For example, a differential pair of conductors is likely to have noise when passing through a connector. As transmission rates increase, the resulting increase in signal edge rates will aggravate this problem.

Existing techniques to reduce coupling between conductors include adding ground conductors between signal conductors or positioning the signal conductors farther away from one another. However, the addition of ground conductors between signal conductors increases the number of conductors, thereby increasing the cost and complexity of the system. Further, if the conductors are traces on a printed circuit board, the addition of ground conductors between signal conductors increases the printed circuit board area required to route all of the conductors. Positioning the signal conductors farther away from one another increases the size of the printed circuit board, connector, integrated circuit package, or other device that handles the conductors.

Figure 1:
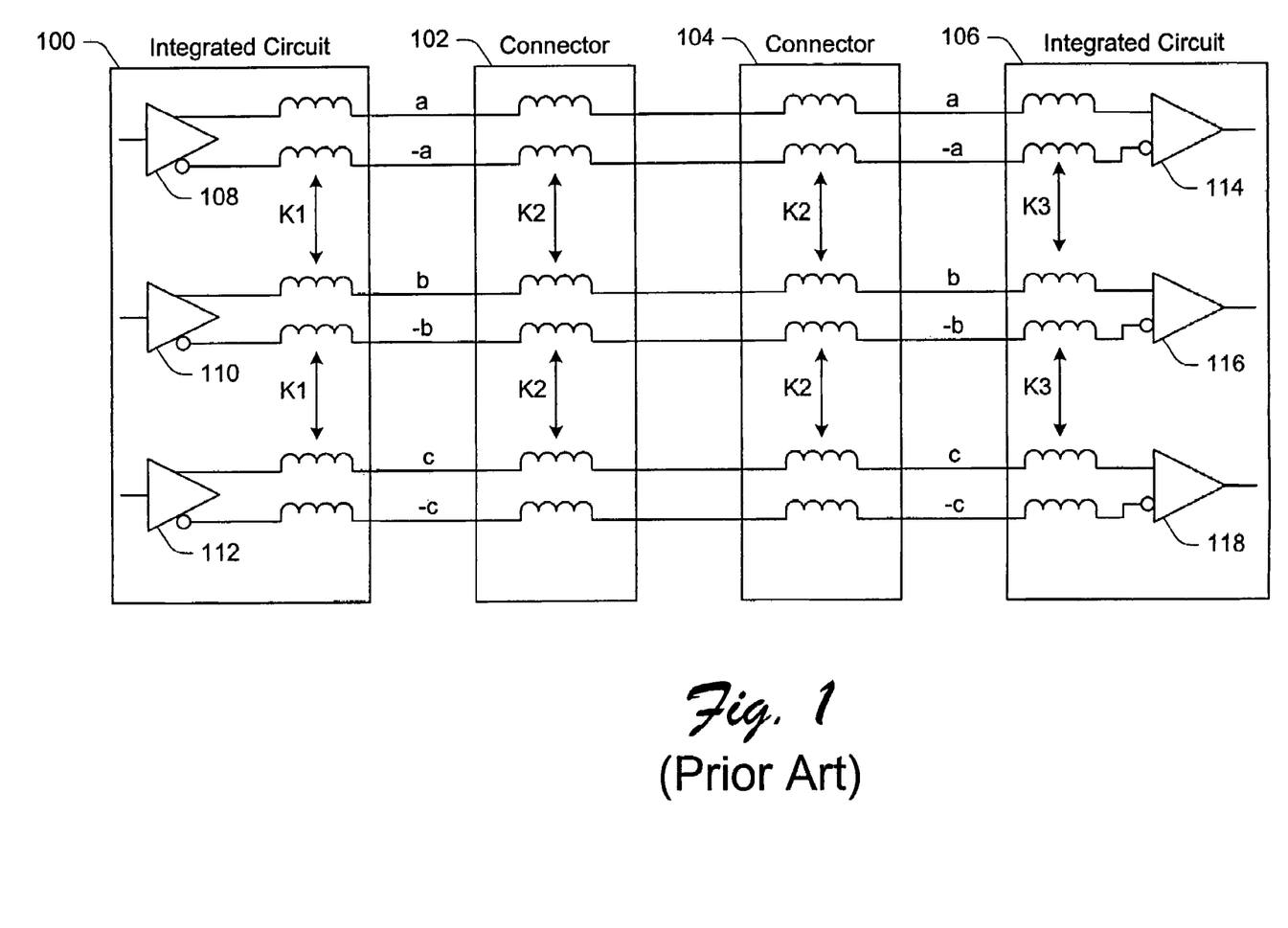
FIG. 1 illustrates a prior art system in which inductive coupling occurs between various conductors.

FIG. 1 illustrates a prior art system in which inductive coupling occurs between various conductors. The system uses differential signaling to transmit three bits of data across three differential line pairs. The inductors shown coupled in series with the various conductors represent the inductances inherent in the conductors. The three data bits are designated as a, −a, b, −b, c, and −c. An integrated circuit 100 receives or generates the three data bits that are provided to differential drivers 108, 110, and 112. The signals generated by the differential drivers 108-112 are transmitted through a connector 102, another connector 104, to another integrated circuit 106.

Each of the three pairs of conductors is coupled to one of three differential receivers 114, 116, or 118, which are contained in integrated circuit 106. For example, the system shown in FIG. 1 may be a backplane having the connectors 102 and 104 mounted to the backplane. In this example, integrated circuits 100 and 106 are mounted on a substrate (such as a printed circuit board) which is electrically coupled to one of the connectors 102, 104.

In the example of FIG. 1, coupling noise is caused by inductive coupling. This coupling corresponds to parasitic mutual inductance which occurs due to the physical construction of the integrated circuit packages and connectors in the system. In FIG. 1, the mutual inductance is represented by inductive coupling coefficient K1, K2, and K3. Since the two connectors 102 and 104 are the same, they have the same inductive coupling coefficient (K2). The two integrated circuit packages 100 and 106 are different, so they each have a different inductive coupling coefficient (K1 and K3).

The signal quality in the system of FIG. 1 is degraded due to the parasitic mutual inductance. For example, if signals a, −a and c, −c switch while signals b, −b are quiet, a noise signal will appear at the receiver end of the line carrying b, −b. This type of noise signal reduces the timing and voltage margins of data arriving at the differential receiver 114, 116 or 118.

The system and method described herein addresses these and other problems by reducing the coupling noise on conductors positioned near one another.

SUMMARY

In one embodiment, a first device is coupled to a first connector. A second connector is coupled to the first connector through multiple conductors, in which alternating pairs of conductors are reversed. A second device is coupled to the second connector through a second group of multiple conductors.

In another embodiment, the first device includes multiple differential drivers to transmit differential signals.

In a particular implementation of the system, the second device includes multiple differential receivers to receive multiple differential signals.

Another embodiment provides that the inductive coupling of the first device is substantially the same as the inductive coupling of the second device.

In a particular embodiment, alternating pairs of conductors in the second group of multiple conductors are reversed.

In a described implementation, a transmitter package is modified such that the coupling coefficient of the transmitter package is substantially the same as the coupling coefficient of a receiver package. Multiple pairs of differential signals are transmitted using the transmitter package. The receiver then receives and decodes the multiple pairs of differential signals.

DETAILED DESCRIPTION

The method and apparatus for transmitting data with reduced coupling noise (both inductive coupling and capacitive coupling) described herein routes the signal conductors in a particular manner to reduce the inductive coupling between signal conductors. Additionally, the transmitter coupling is modified to be approximately the same as the receiver coupling to reduce the inductive coupling between signal conductors. Particular examples herein are described with reference to integrated circuits and connectors. However, the teachings of the present invention can be applied to any type of device coupled to any type of interconnection mechanism.

Figure 2:
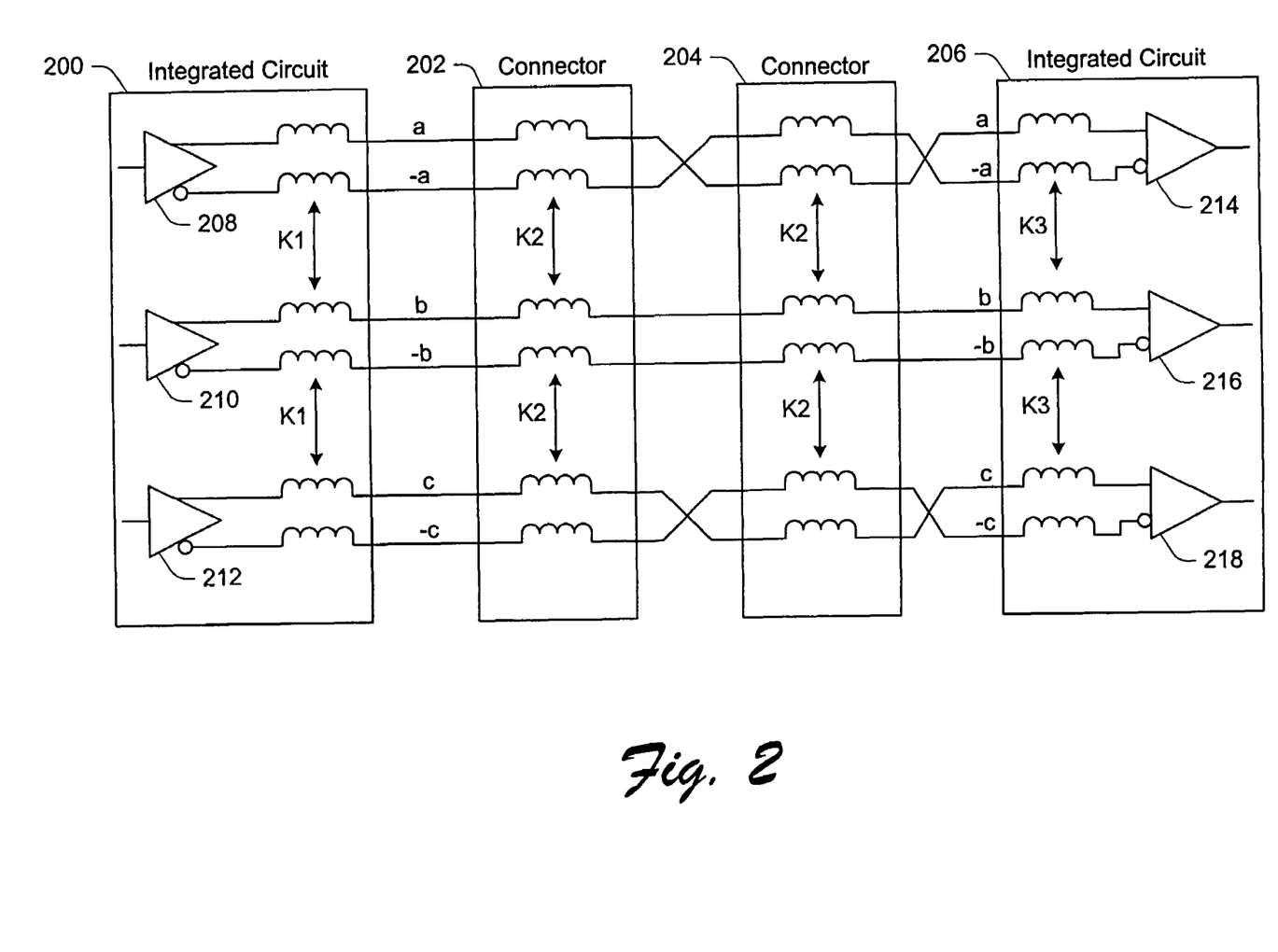
FIG. 2 illustrates an embodiment of a system that reduces coupling noise.

FIG. 2 illustrates an embodiment of a system that reduces inductive coupling noise. An integrated circuit 200 receives or generates three data bits (labeled a, −a, b, −b, c, and −c), and contains three differential drivers 208, 210, and 212. Each of the three pairs of signal conductors is coupled to one of the three differential drivers. Differential drivers 208-212 may also be referred to as differential transmitters. The integrated circuit 200 can be any type of integrated circuit such as a memory device, a processor, an ASIC, or programmable logic devices. The signal conductors used to transmit data may include wires, cables, traces on a printed circuit board, conductors embedded within a substrate (e.g., between different layers of a substrate), and various other conductive materials.

The signals generated by the differential drivers 208-212 are transmitted through a connector 202, another connector 204, to another integrated circuit 206. Integrated circuit 206 contains three differential receivers 214, 216, and 218, each coupled to receive a different pair of signal conductors. Differential receivers 214-218 may also be referred to as differential decoders. The connectors 202 and 204 can be any type of electrical connecting device capable of coupling with at least one component, such as a mating connector, a substrate, an edge of a printed circuit board, etc.

In a particular embodiment, the system of FIG. 2 is a backplane having multiple connectors (e.g., connectors 202 and 204) electrically coupled to the backplane. The backplane is a printed circuit board, which can be manufactured using any type of substrate capable of supporting the multiple connectors and multiple conductors that interconnect the multiple connectors. The backplane may be a multi-level board having multiple layers of substrate materials and/or conductive materials. In this embodiment, the integrated circuits 200 and 206 are mounted on another substrate (e.g., a printed circuit board or "card") that is electrically coupled to the corresponding connector 202 or 204. In a particular configuration, integrated circuits 200 and 206 are memory devices (either volatile or non-volatile memory devices), each of which is mounted on a printed circuit board. The memory device and printed circuit board combination may be referred to as a memory module. Any number of memory modules can be electrically coupled to connectors mounted to a backplane.

As shown in FIG. 2, the two outer differential pairs (i.e., a, −a and c, −c) have a polarity reversal (also referred to as a "twist" or a conductor reversal) between the two connectors 202 and 204. This polarity reversal significantly reduces (or eliminates) the coupling noise of the two connectors 202 and 204 because any coupling noise added by connector 202 is subtracted by connector 204. The polarity is reversed again between connector 204 and integrated circuit 206. This second polarity reversal ensures that the differential receiver receives the inverted and non-inverted signals on the appropriate input pins.

In an alternate embodiment, the second polarity reversal is not necessary because the polarity of the input connections to the differential receiver is reversed. For example, in the orientation shown in FIG. 2, without the second polarity reversal, the "a" signal (non-inverted) would be coupled to the inverted input to the differential receiver 214 and the "−a" signal (inverted) would be coupled to the non-inverted input to the differential receiver 214. However, if the orientation of the differential receiver 214 is reversed such that the positions of the inputs to the differential receiver are reversed, then the second polarity reversal of the signal conductors is not necessary.

Figure 3:
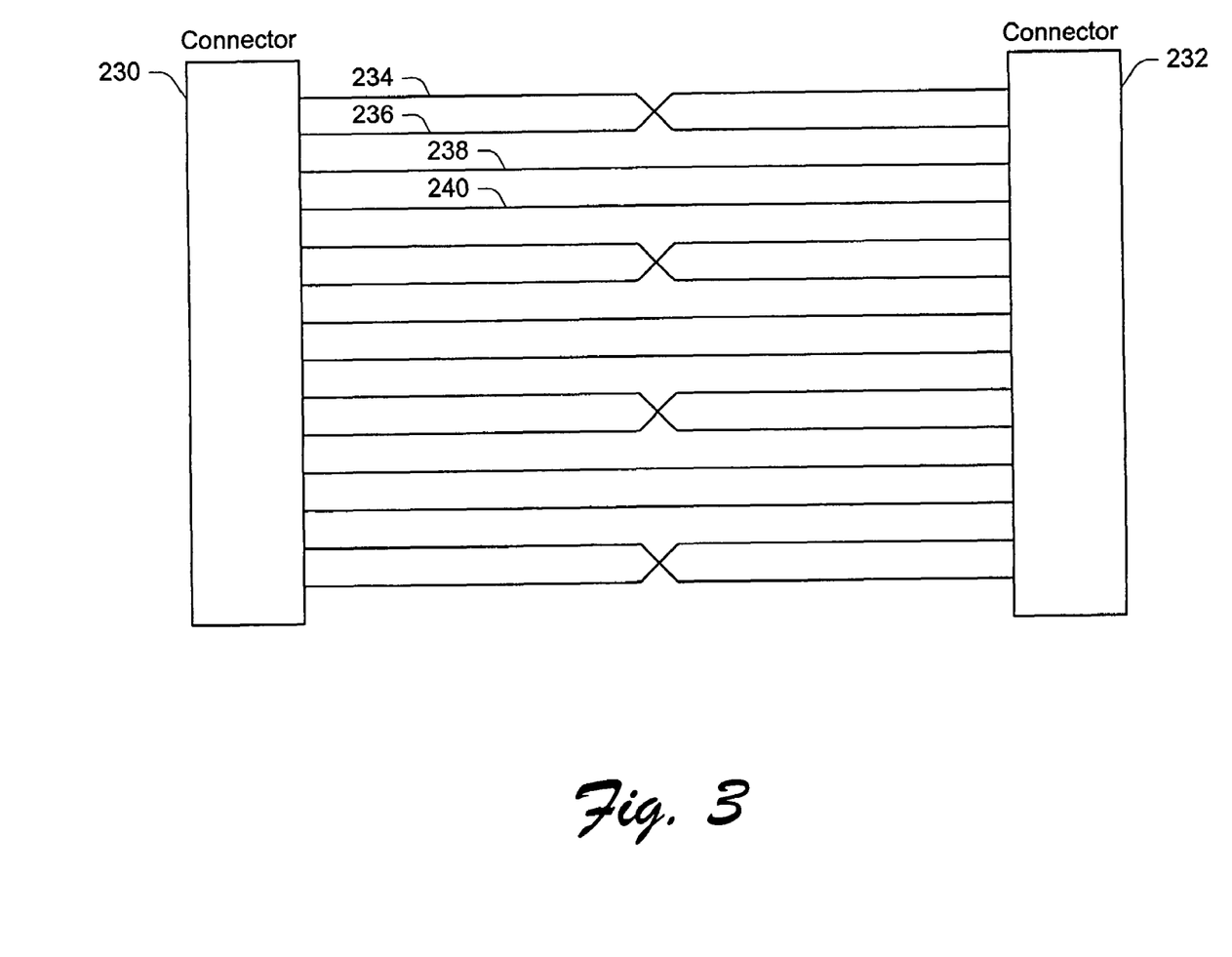
FIG. 3 illustrates a pair of connectors coupled together with multiple pairs of transmission lines.

FIG. 3 illustrates a pair of connectors 230 and 232 coupled together with multiple pairs of conductors. As shown in FIG. 3, alternating pairs of conductors have reversed polarity. As discussed above, this reversed polarity significantly reduces (or eliminates) the coupling noise induced by the two connectors because any coupling noise added by one connector is subtracted by the other connector. The top pair of conductors 234 and 236 have their polarity reversed. The next pair of conductors 238 and 240 are not reversed. The next pair of conductors have a reversed polarity, and the next pair is not reversed. This pattern of reversing the polarity of alternating pairs of conductors continues until the last pair of conductors. In the example of FIG. 3, seven pairs of conductors are illustrated. However, the teachings of the present invention can be applied to systems having any number of pairs of conductors coupled between two connectors.

Additionally, in the example of FIG. 3, the polarity reversals are shown approximately midway between the two connectors 230 and 232. However, in alternate embodiments, the polarity reversals may be located anywhere between the two connectors 230 and 232. Further, the polarity reversals need not occur at the same location. For example, a first polarity reversal may occur close to connector 230, a second polarity reversal may occur midway between the two connectors 230 and 232, and a third polarity reversal may occur close to the connector 232.

Figure 4:
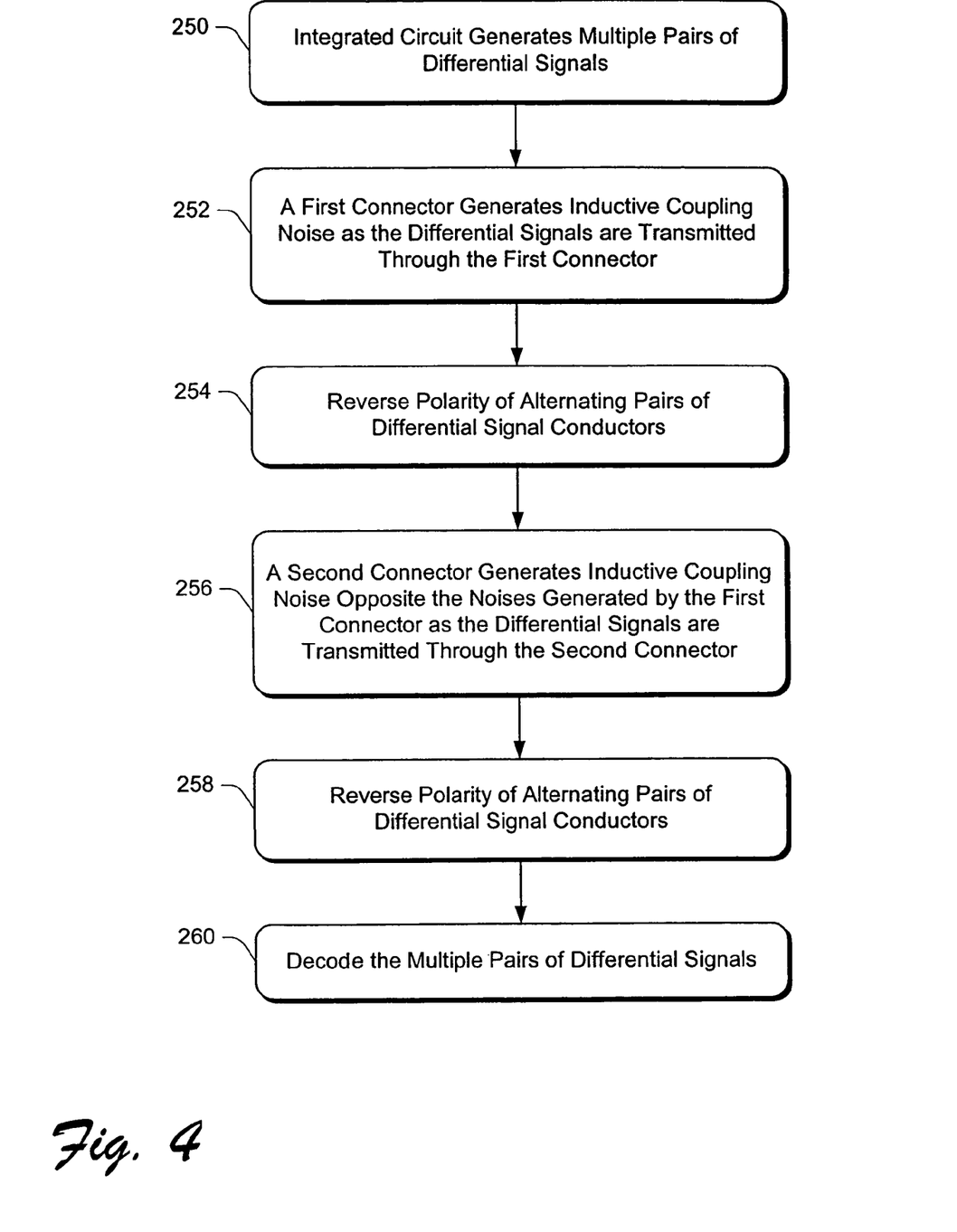
FIG. 4 is a flow diagram illustrating a procedure for reducing coupling noise between conductors.

FIG. 4 is a flow diagram illustrating a procedure for reducing coupling noise between conductors. First, an integrated circuit generates multiple pairs of differential signals (block 250). A first connector generates inductive coupling noise as the differential signals are transmitted through the first connector (block 252). Next, the procedure reverses the polarity of alternating pairs of differential signal conductors (block 254). A second connector generates inductive coupling noise opposite the noise generated by the first connector as the differential signals are transmitted through the second connector (block 256). The procedure then reverses the polarity of alternating pairs of differential signal conductors (block 258). The pairs of signal conductors reversed in block 258 are the same as those reversed in block 254. Finally, the procedure decodes the multiple pairs of differential signals.

Figure 5:
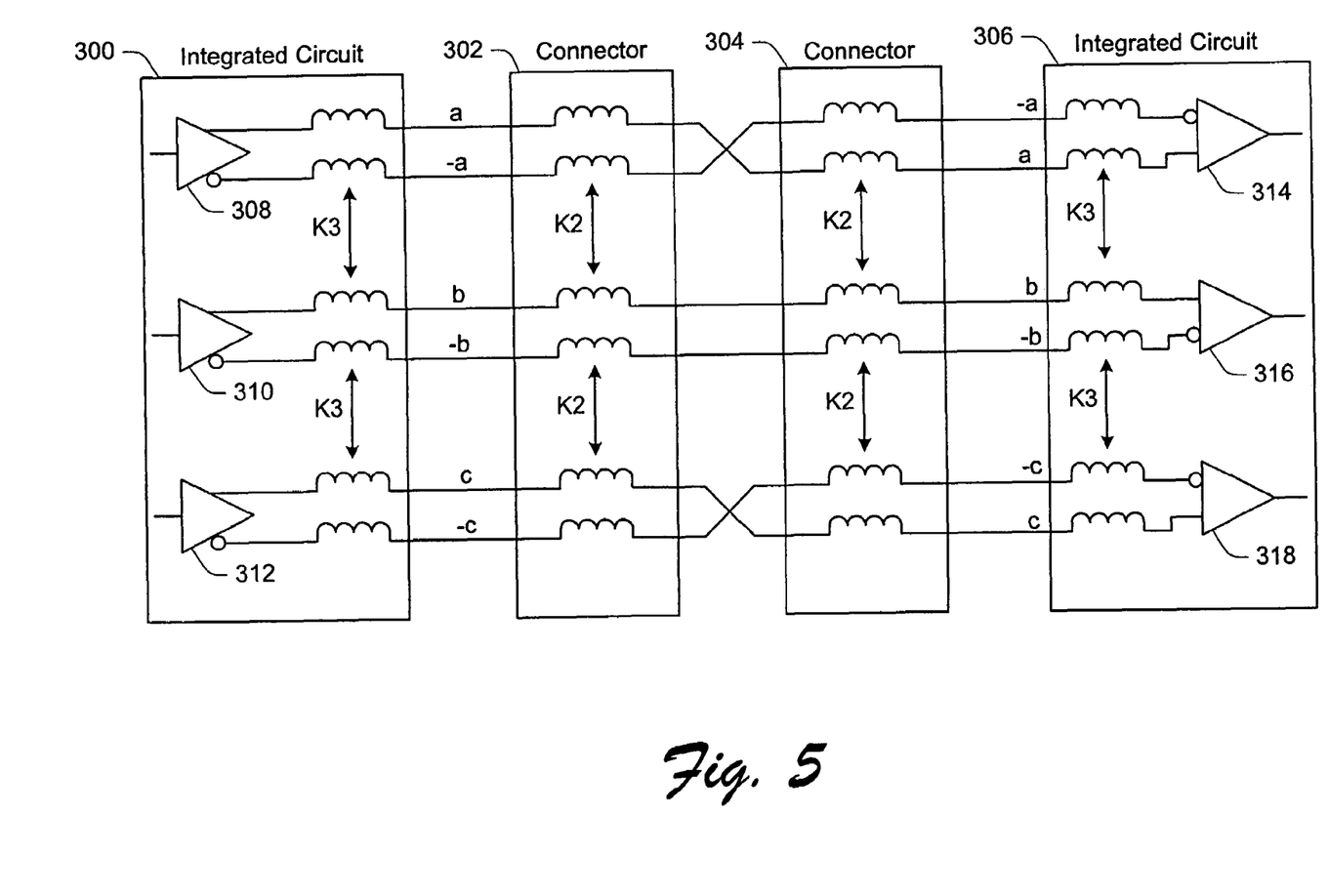
FIG. 5 illustrates another embodiment of a system that reduces coupling noise between conductors.

FIG. 5 illustrates another embodiment of a system that reduces coupling noise between conductors. The system illustrated in FIG. 5 is similar to the system illustrated in FIG. 2. An integrated circuit 300 includes three differential drivers 308, 310, and 312. Integrated circuit 300 may also be referred to as the transmitter package because it transmits the signals. The signals generated by the differential drivers 308-312 are transmitted through a connector 302, another connector 304, to another integrated circuit 306, which includes three differential receivers 314, 316, and 318. Integrated circuit 306 may also be referred to as the receiver package because it receives the signals from the transmitter package (i.e., integrated circuit 300).

In the embodiment of FIG. 5, the polarity of alternating pairs of conductors (i.e., a, −a and c, −c) is reversed between the two connectors 302 and 304. However, there is no corresponding polarity reversal between connector 304 and integrated circuit 306, as shown in FIG. 2. Also, the inductive coupling between conductors in integrated circuit 300 is K3, which is the same inductive coupling as in integrated circuit 306. In this embodiment, the inductive coupling noise caused by the two connectors 302 and 304 is significantly reduced due to the polarity reversal in the conductors, as discussed above. Further, the inductive coupling noise caused by the two integrated circuits 300 and 306 is reduced because the two is integrated circuits have substantially the same inductive coupling coefficient.

The system shown in FIG. 5 is designed to provide symmetric coupling between the two halves of the transmission lines (i.e., integrated circuit 300 and connector 302 represent one half, and connector 304 and integrated circuit 306 represent the other half. The symmetry between the two connectors 302 and 304 is provided by the polarity reversal between the two connectors. Similarly, the symmetry between the two integrated circuits 300 and 306 is provided by the same coupling in the two integrated circuits.

In a particular system, the receiver package (i.e., integrated circuit 306) has more coupling than the transmitter package (i.e., integrated circuit 300). To provide the necessary symmetry, the coupling of the transmitter package is increased (i.e., more coupling noise is generated) to match the coupling of the receiver package. The coupling coefficient of the transmitter package can be increased by redesigning the package of the integrated circuit so that the coupling coefficient of the transmitter package is substantially similar to the coupling coefficient of the receiver package. For example, in a typical integrated circuit package, crosstalk results from the inductive coupling between bond wires. The inductive coupling is proportional to the length of the bond wires, in which longer bond wires have greater inductive coupling. Thus, the coupling coefficient of the transmitter package can be increased by increasing the bond wire length.

As shown in FIG. 5, the polarity of the conductors is not reversed between connector 304 and integrated circuit 306 (as was the case in FIG. 2). However, the orientation of the differential receivers 314 and 318 is reversed such that the inverted signal (−a and −c) is coupled to the inverted input of the differential receiver and the non-inverted signal (a and c) is coupled to the non-inverted input of the differential receiver. Note that the orientation of differential receiver 316 is not reversed because the associated pair of conductors were not reversed between the two connectors 302 and 304.

In an alternative embodiment, the orientation of differential receivers 314 and 318 is not changed. Thus, the inverted signals are coupled to the non-inverted inputs and the non-inverted signals are coupled to the inverted inputs. Thus, the differential receivers 314 and 318 generate incorrect outputs (i.e., the opposite of the actual value). This is easily corrected by coupling an inverter to the output of each differential receiver 314 and 318. The output of the inverter is the correct output for the system.

In another embodiment, two integrated circuits (e.g., integrated circuits 300 and 306) are coupled to one another through multiple pairs of conductors (i.e., a chip-to-chip link). As mentioned above, the inductive coupling coefficient of the first integrated circuit is designed to be substantially the same as the inductive coupling coefficient of the second integrated circuit. In this embodiment, no connectors are located between the two integrated circuits. This configuration provides for the reversing of polarities on alternating line pairs, in the manner discussed. Thus, instead of reversing polarities of signal lines between two connectors, this configuration reverses the polarity of signal lines coupled between the two integrated circuits.

Figure 6:
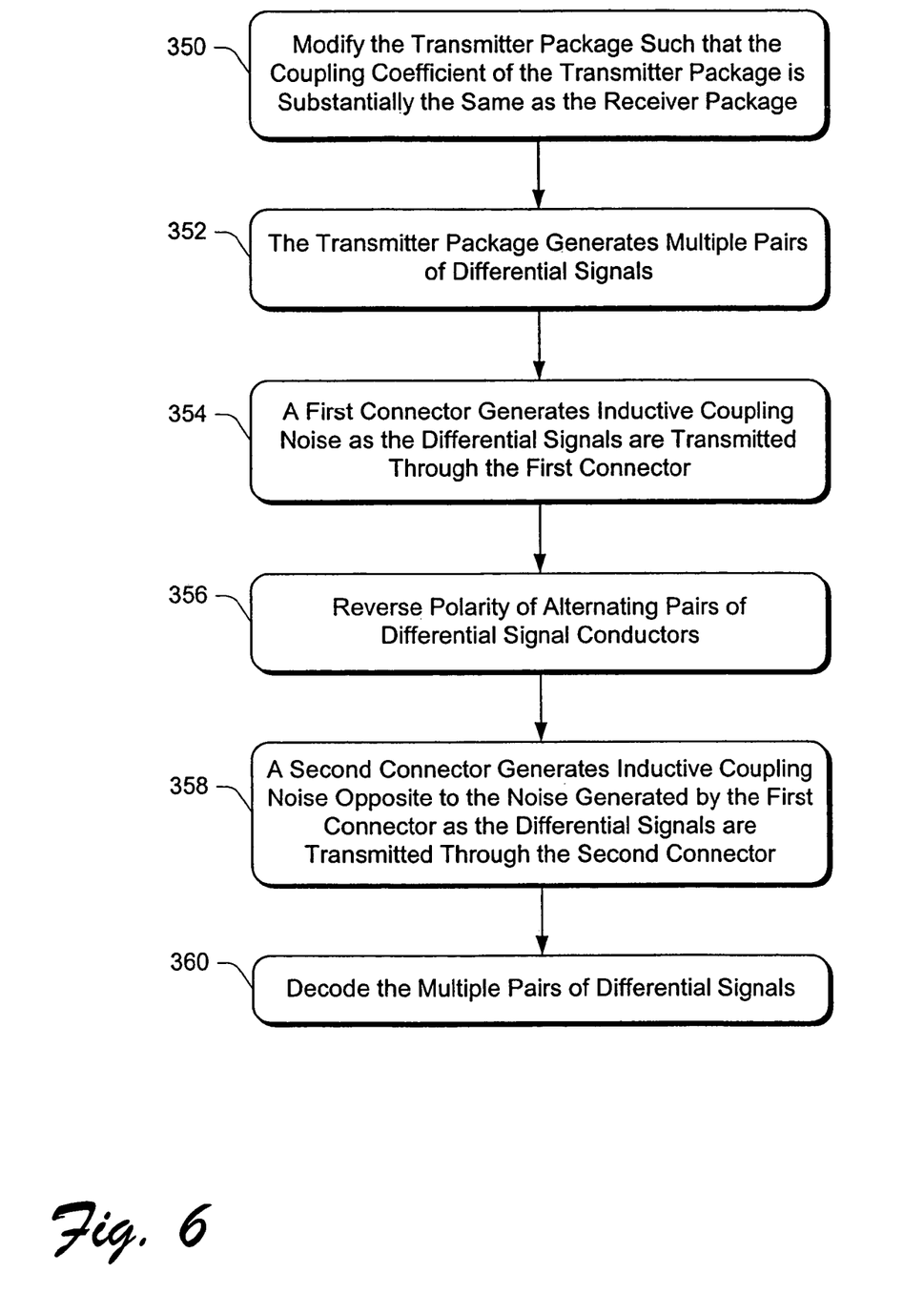
FIG. 6 is a flow diagram illustrating another procedure for reducing coupling noise between conductors.

FIG. 6 is a flow diagram illustrating another procedure for reducing coupling noise between conductors. The flow diagram shown in FIG. 6 corresponds to the system shown in FIG. 5. First, the transmitter package is modified such that the coupling coefficient of the transmitter package is substantially the same as the receiver package (block 350). The transmitter package generates multiple pairs of differential signals (block 352). A first connector generates inductive coupling noise as the differential signals are transmitted through the first connector (block 354). Next, the procedure reverses the polarity of alternating pairs of differential signal conductors (block 356). A second connector generates inductive coupling noise opposite to the noise generated by the first connector as the differential signals are transmitted through the second connector (block 358). Finally, the procedure decodes the multiple pairs of differential signals (block 360).

Thus, a system has been described that reduces inductive coupling noise between conductors. The noise reduction is accomplished by reversing alternating pairs of conductors and/or modifying the coupling of the integrated circuit packages such that the transmitter coupling is substantially the same as the receiver coupling.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A system comprising:
    a printed circuit board;
    a first integrated circuit mounted on the printed circuit board, where the first integrated circuit comprises a plurality of differential drivers;
    a second integrated circuit mounted on the printed circuit board, where the second integrated circuit comprises a plurality of differential receivers;
    a plurality of pairs of conductors each electrically coupling a respective one of the differential drivers to a respective one of the differential receivers, wherein each alternating pair of the plurality of pairs of conductors includes a first conductor crossover where a first conductor of that alternating conductor pair is crossed over a second conductor of that alternating conductor pair, and for each alternating pair of conductors that includes a first conductor crossover, further comprising:
        (i) a second conductor crossover where the second conductor of that alternating conductor pair is crossed over the first conductor of that alternating conductor pair; or
        (ii) coupling that alternating pair to a differential receiver having inputs with an orientation that is reversed to that of an adjacent differential receiver, and wherein each of the other pairs of conductors, besides said alternating pairs, does not include any crossover.

2. The system of claim 1, wherein the first integrated circuit has a first inductive coupling coefficient and the second integrated circuit has a second inductive coupling coefficient that is substantially the same as the first inductive coupling coefficient.

3. The system of claim 1, wherein the first integrated circuit and the second integrated circuit are memory devices.

4. The system of claim 1, wherein the printed circuit board is a module.

5. The system of claim 4, wherein the printed circuit board is a memory module.

6. The system of claim 1, further comprising at least one connector electrically coupled to the plurality of pairs of conductors, wherein the at least one connector is situated between the first integrated circuit and the second integrated circuit.

7. The system of claim 6, wherein the first conductor crossover is between the at least one connector and at least one of the first integrated circuit and the second integrated circuit.

8. The system of claim 1, further comprising two connectors electrically coupled to the plurality of pairs of conductors, wherein the two connectors are situated between the first integrated circuit and the second integrated circuit.

9. The system of claim 8, wherein the first conductor crossover is between the two connectors.

10. A system comprising:
a printed circuit board;
a first integrated circuit mounted on the printed circuit board, where the first integrated circuit comprises a plurality of differential drivers;
a second integrated circuit mounted on the printed circuit board, where the second integrated circuit comprises a plurality of differential receivers;
a plurality of conducting line pairs each electrically coupling a respective one of the differential drivers to a respective one of the differential receivers, wherein each alternating line pair of the plurality of conducting line pairs has a reversed polarity at one end thereof that is electrically coupled to a differential driver or receiver having inputs with an orientation that is reversed to that of an adjacent differential driver or receiver, respectively.

11. The system of claim 10, wherein each alternating line pair comprises a first line crossed over a second line.

12. The system of claim 10, wherein the first integrated circuit has a first inductive coupling coefficient and the second integrated circuit has a second inductive coupling coefficient that is substantially the same as the first inductive coupling coefficient.

13. The system of claim 10, wherein the first integrated circuit and the second integrated circuit are memory devices.

14. The system of claim 10, wherein the printed circuit board is a module.

15. The system of claim 10, further comprising at least one connector electrically coupled to the plurality of conducting line pairs between the first integrated circuit and the second integrated circuit, wherein lines of each alternating line pair cross over one another between the at least one connector and at least one of the first integrated circuit and the second integrated circuit.

16. The system of claim 10, further comprising two connectors electrically coupled to the plurality of conducting line pairs between the first integrated circuit and the second integrated circuit, wherein lines of each alternating line pair cross over one another between the two connectors.

17. A system comprising:
a printed circuit board including at least a first line pair, a second line pair disposed adjacent the first line pair, and a third line pair disposed adjacent to the second line pair;
a first integrated circuit disposed on the printed circuit board, wherein the first integrated circuit is coupled to the first line pair, second line pair and third line pair;
a second integrated circuit disposed on the printed circuit board and electrically coupled to the first line pair, second line pair, and third line pair, wherein each of the first line pair and third line pair includes a first crossover where a first line of each of the first and third line pairs is crossed over a second line of each of the first and third line pairs, respectively, and a second crossover where the second line of each of the first and third line pairs is crossed over the first line of each of the first and third line pairs, respectively, and wherein the second line pair does not include any crossover.

18. The system of claim 17, wherein the first integrated circuit has a first inductive coupling coefficient and the second integrated circuit has a second inductive coupling coefficient that is substantially the same as the first inductive coupling coefficient.

19. The system of claim 17, wherein the first integrated circuit and the second integrated circuit are memory devices.

20. The system of claim 17, wherein the system is a module.

21. The system of claim 17, wherein the system is a memory module.

22. The system of claim 17, further comprising at least one connector electrically coupled to the plurality of conducting line pairs between the first integrated circuit and the second integrated circuit, wherein each of the first and third line pairs comprises a first line crossed over a second line between the at least one connector and at least one of the first integrated circuit and the second integrated circuit.

23. The system of claim 17, further comprising two connectors electrically coupled to the first line pair, second line pair and third line pair between the first integrated circuit and the second integrated circuit.

24. The system of claim 17, wherein:
the first integrated circuit comprises a differential driver coupled to the first line pair; and
the second integrated circuit comprises a differential receiver coupled to the first line pair.

25. A system comprising:
a first line pair, a second line pair disposed adjacent the first line pair, and a third line pair disposed adjacent to the second line pair;
a first integrated circuit including a first differential driver coupled to the first line pair, a second differential driver coupled to the second line pair, and a third differential driver coupled to the third line pair; and
a second integrated circuit including a first differential receiver coupled to the first line pair, a second differential receiver coupled to the second line pair, and a third differential receiver coupled to the third line pair, wherein each of the first line pair and third line pair includes a first line crossed over a second line, wherein the first differential receiver and the third differential receiver have inputs with an orientation that is reversed to that of the second differential receiver.

26. The system of claim 25, wherein the first integrated circuit and the second integrated circuit are memory devices.

27. A module comprising:
a first integrated circuit;
a second integrated circuit; and
a plurality of pairs of conductors electrically coupling the first integrated circuit to the second integrated circuit, wherein each alternating pair of the plurality of pairs of conductors includes a first crossover having a first line crossed over a second line, and a second crossover having the second line crossed back over the first line, and wherein each of the other pairs of conductors, besides said alternating pairs, does not include any crossover.

28. The system of claim 27, wherein the first integrated circuit and the second integrated circuit are memory devices.

29. The system of claim 27, wherein the first integrated circuit and the second integrated circuit each comprise a plurality of differential drivers and a plurality of differential receivers, wherein each differential driver of the plurality of differential drivers is coupled to a respective pair of conductors of the plurality of pairs of conductors and wherein each differential receiver of the plurality of differential receivers is coupled to a respective pair of conductors of the plurality of pairs of conductors.

30. A memory module comprising:
a first integrated circuit memory device, where the first integrated circuit comprises a plurality of differential drivers;
a second integrated circuit memory device, where the second integrated circuit comprises a plurality of differential receivers;
a plurality of pairs of conductors each electrically coupling a respective one of the differential drivers to a respective one of the differential receivers, wherein each alternating pair of the plurality of pairs of conductors includes a first line crossed over a second line; and
an inverter coupled to the output of each differential receiver that is coupled to an alternating pair of the plurality of pairs of conductors, and wherein each of the other pairs of conductors, besides said alternating pairs, does not include any crossover.

31. The system of claim 30, wherein the first integrated circuit memory device comprises a plurality of differential drivers, wherein each differential driver of the plurality of differential drivers is coupled to a respective pair of conductors of the plurality of pairs of conductors.

32. The system of claim 30, wherein each differential receiver of the plurality of differential receivers is coupled to the respective pair of conductors of the plurality of pairs of conductors.

* * * * *

UNITED STATES PATENT AND TRADEMARK OFFICE
CERTIFICATE OF CORRECTION

PATENT NO. : 7,627,043 B2  Page 1 of 1
APPLICATION NO. : 11/130502
DATED : December 1, 2009
INVENTOR(S) : Horowitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1233 days.

Signed and Sealed this

Second Day of November, 2010

David J. Kappos
*Director of the United States Patent and Trademark Office*